(12) United States Patent
Ricketts

(10) Patent No.: US 7,988,403 B2
(45) Date of Patent: Aug. 2, 2011

(54) BULK MATERIALS CART HAVING DUAL UNLOAD CAPABILITY

(75) Inventor: Jonathan E. Ricketts, Ephrata, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/557,072

(22) Filed: Sep. 10, 2009

(65) Prior Publication Data

US 2010/0290878 A1     Nov. 18, 2010

Related U.S. Application Data

(60) Provisional application No. 61/216,521, filed on May 18, 2009.

(51) Int. Cl.
*B60P 1/38* (2006.01)
(52) U.S. Cl. .................. 414/505; 414/526; 414/528
(58) Field of Classification Search .......... 414/502–505, 414/526–528
See application file for complete search history.

(56) References Cited

U.S. PATENT DOCUMENTS

| | | | |
|---|---|---|---|
| 2,797,001 A | 6/1957 | Smith | |
| 2,885,209 A | 5/1959 | Bruecker | |
| 3,014,729 A | 12/1961 | Henningsen et al. | |
| 3,874,609 A | 4/1975 | Larson | |
| 3,995,836 A * | 12/1976 | Carter et al. | 366/192 |
| 4,958,756 A | 9/1990 | Conway | |
| 5,993,130 A * | 11/1999 | Theurer et al. | 414/339 |
| 6,042,326 A | 3/2000 | Thomas et al. | |
| 7,040,980 B1 * | 5/2006 | Kestel | 460/114 |
| 7,134,830 B2 | 11/2006 | Wood | |
| 2006/0018742 A1 * | 1/2006 | Hook | 414/502 |

FOREIGN PATENT DOCUMENTS

| | | |
|---|---|---|
| EP | 1606990 | 12/2005 |
| GB | 2035822 | 6/1980 |
| WO | 91/05460 | 5/1991 |

* cited by examiner

*Primary Examiner* — Gregory W Adams
*Assistant Examiner* — Jonathan D Snelting
(74) *Attorney, Agent, or Firm* — Michael G. Harms; Patrick M. Sheldrake

(57) ABSTRACT

The bulk materials cart has a dual unload system including at least two inclined belt conveyors bounding an enclosed cavity. A first belt conveyor is operable for conveying bulk materials from the cavity to an unloading conveyor extendable from that side of the cart. A second belt conveyor is operable for conveying bulk materials upwardly and over another side of the cart. The dual unload system is automatically operable in a first mode operating the first belt conveyor and the unloading conveyor for conveying the bulk materials away from the cart, and in a second mode operating the second belt conveyor for conveying the bulk materials over the side of the cart.

7 Claims, 7 Drawing Sheets

BULK MATERIALS CART HAVING DUAL UNLOAD CAPABILITY

This application claims the benefit of U.S. Provisional Application No. 61/216,521, filed May 18, 2009.

TECHNICAL FIELD

This invention relates generally to a cart for receiving and holding bulk materials such as agricultural crop material and the like, and more particularly, to a material cart having an unloading system having at least two operating modes, to provide different manners of unloading, including at least a rapid bulk type unloading over a wall of the cart, and a conveyor type, in cantilever relation to the cart.

BACKGROUND OF THE INVENTION

U.S. Provisional Application No. 61/216,521, filed May 18, 2009, is incorporated herein in its entirety by reference.

A variety of materials are carried in carts, or wagons, herein collectively referred to generally by the term cart. As a non-limiting example, are agricultural crop materials, such as silage, crop residue such as cobs from corn, and the like, and animal waste or manure. Of particular interest presently are corn cobs and other crop residue, for which demand has recently increased, due to use in making ethanol. The generation of corn cobs in volume occurs during the corn harvesting process, which is typically done using a combine, generally by threshing and cleaning the kernels of corn from the cobs, husks and other residue or stover.

The corn kernels are typically collected, at least initially, in a clean grain tank of the combine, which is periodically unloaded, often on the go, during the harvesting operation. If the cobs (and/or other residue) is/are collected, a separate container is typically used, and is often a cart or wagon towed by the combine. Due to limitations on the towing capacity of combines, the size or capacity of such carts or wagons is limited, and thus the cart or wagon must also be unloaded from time to time, often at different times or frequency than the unloading of the corn, which can have a negative effect on productivity and efficiency. Also, during some harvesting operations, it is sometimes desired or necessary to unload the cobs onto a surface such as the ground for later pick up, and in other instances, into another container, such as a larger cart, a truck or the like, often while on the go. And in both instances, it is often desired to unload relatively quickly.

Common known unloading systems for carts include unloading or drag chains and augers in the bottom of the cart, alone or in combination with gravity systems. Tipping gravity systems are also known. However, none of the known cart unloading systems provide a dual capability, that is, two different manners of unloading, one better suited for unloading in a pile on the ground, and another more suited for unloading into another container.

Thus, what is sought is a bulk materials cart providing dual unloading capabilities, particularly for corn cobs, including one for rapidly unloading onto the ground or another surface, and one for unloading into another container, including on the go, if desired or required.

SUMMARY OF THE INVENTION

A bulk materials cart providing dual unloading capabilities, particularly for corn cobs, including one for rapidly unloading onto the ground or another surface, and one for unloading into another container, including on the go, if desired or required, is disclosed.

According to a preferred aspect of the invention, the cart includes a mobile structure defining and enclosing a cavity for holding a quantity of bulk materials, the structure including a conveyor floor and at least two belt conveyors bounding edges of the floor and extending upwardly therefrom at an inclined orientation. A first of the belt conveyors extends and is operable for conveying bulk materials from the cavity to an unloading conveyor mounted to the structure for movement to a position extending outwardly therefrom, and a second of the belt conveyors is operable for conveying bulk materials upwardly and thereover from the cavity.

The dual unload system is preferably automatically operable in a first unload mode operating the conveyor floor for conveying bulk materials in the cavity toward the first belt conveyor while operating that conveyor, for conveying the bulk materials to the unloading conveyor, which will convey the bulk materials away from the cart. The unload system is automatically operable in a second unload mode operating the conveyor floor for conveying bulk materials in the cavity toward the second belt conveyor while operating that conveyor for conveying the bulk materials over that side of the cart. As a result, by operation in the first unload mode, the bulk materials can be conveyed in a controlled manner, away from the cart, for instance, to a vehicle such as a truck or wagon. This can be done on the go, with the receiving vehicle moving at the same rate as the cart. In the second unload mode, the bulk materials can be unloaded rapidly, for instance, onto the ground, or another surface. This dual unload capability is well suited for agricultural bulk materials such as collection of corn cobs from a harvester such as a combine, as it provides the versatility to unload, on the go to another container, and to unload onto the ground, for instance, at the end of a field.

According to another preferred aspect of the invention, the inclined belt conveyors comprise upstanding walls of the mobile structure for containing the bulk materials in the cavity, preferably side walls, the ends of the cavity being enclosed by fixed walls or doors. The belt conveyors also preferably extend the width of the walls, and the floor conveyor and the unloading conveyor are also belt conveyors. Additionally, a transfer conveyor can be provided for receiving the bulk material from the first inclined conveyor, and operable for conveying the material to the unloading conveyor. A deflector can also be provided spaced above the upper peripheral edge of the second inclined conveyor, for guiding and controlling the flow of the bulk materials from the cart. As still another alternative, the cart can be configured to have a V-shape internal cavity defined by only inclined belt conveyors, thus eliminating the conveyor floor, the belt conveyors being operable in one direction or the other for unloading in a selected mode.

DETAILED DESCRIPTION OF THE INVENTION

Figure 1:
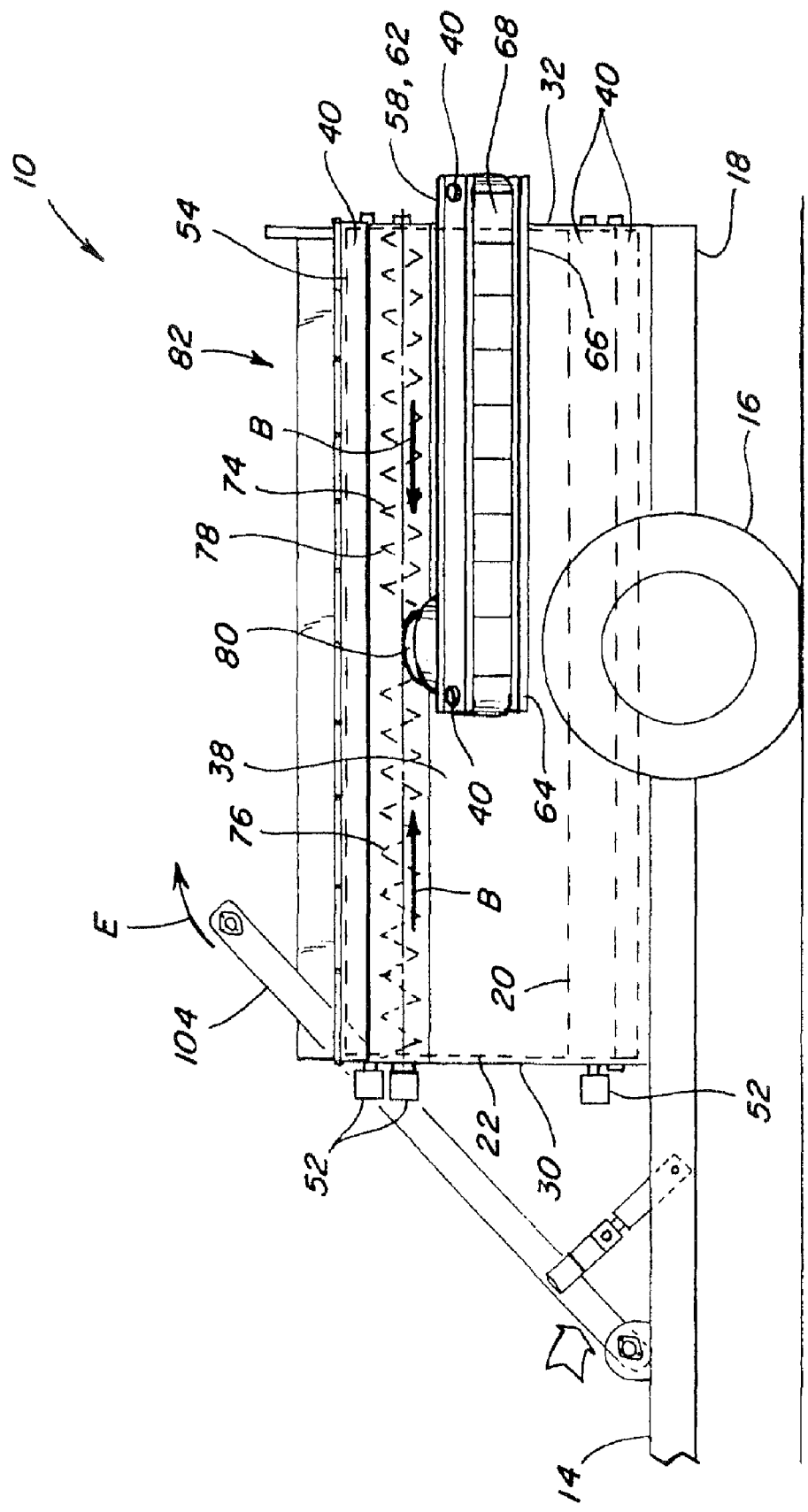
FIG. 1 is a side view of a bulk materials cart providing dual unloading capabilities, constructed and operable according to the teachings of the present invention.
Figure 2:
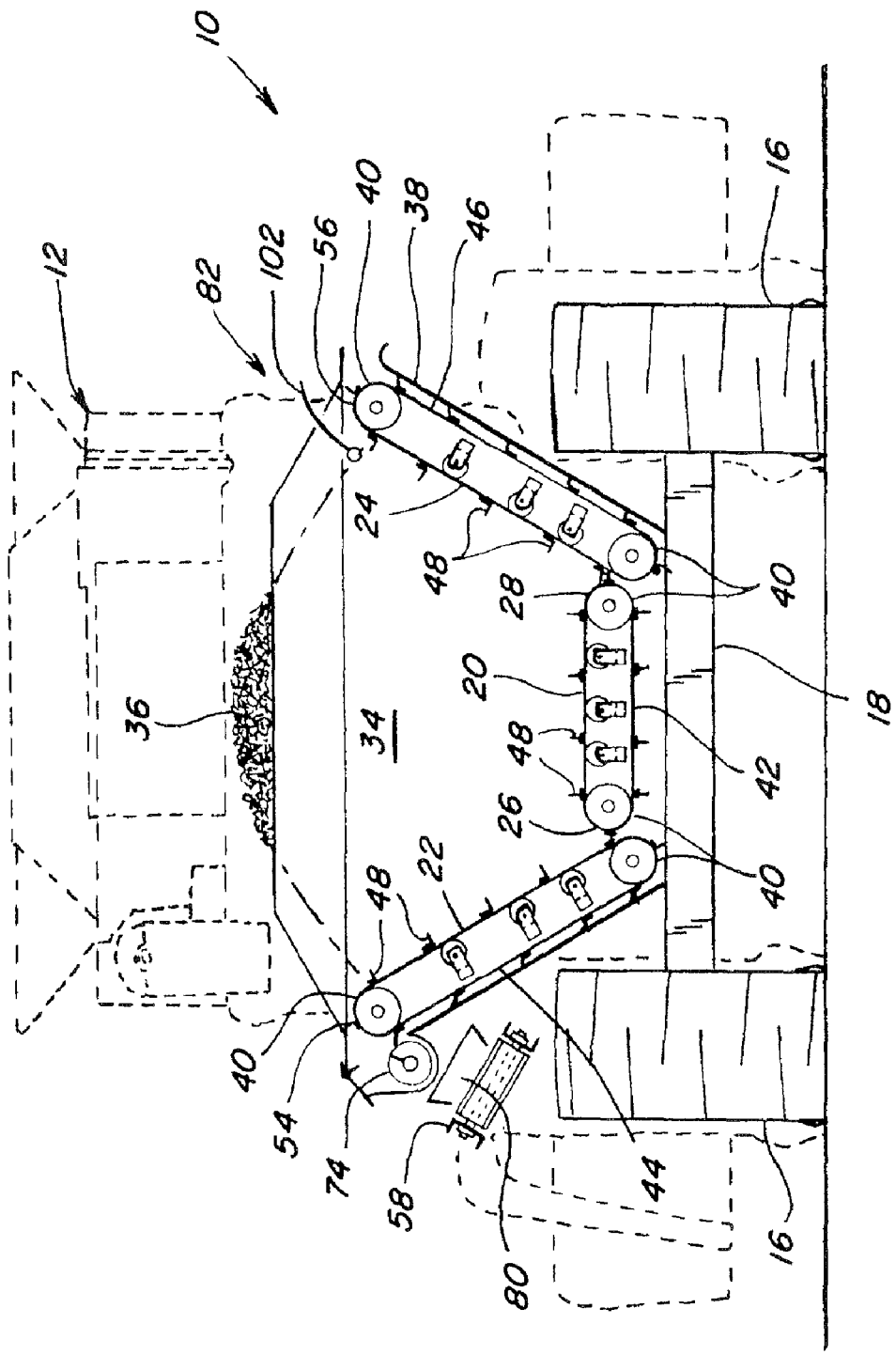
FIG. 2 is a rear end view of the cart, with an end panel removed to reveal an interior cavity of the cart including aspects of a dual unloading system thereof, and showing an accompanying agricultural combine in dotted lines for towing the cart.

Referring now to the drawings, in FIGS. 1, 2, 3, 4, 5 and 6, a preferred embodiment of a bulk materials cart 10 providing dual unloading capabilities, constructed and operable according to the teachings of the present invention, is shown. Cart 10 as illustrated is configured for holding and unloading a wide variety of bulk materials, including, but not limited to, agricultural products such as corn cobs generated during corn harvesting operations in the well-known manner. Here, cart 10 is variously illustrated in association with an agricultural combine 12 operable in the well-known manner for harvesting ears of corn from corn plants, separating the kernels of corn from the cobs and other crop residue or stover, and discharging the cobs from the combine. Cart 10 is configured for receiving and holding a large quantity of corn cobs from a combine, such as combine 12, which can be conveyed to cart 10 in any suitable manner (not shown) such as utilizing a conveyor device, airborne flight, or the like. In this regard, cart 10 can be configured so as to include a forwardly extending tongue 14 (FIG. 1) including structure such as a clevis, ball receiver, or other connector (not shown) for connection in towed relation to a towing vehicle such as combine 12. Here also, for mobility, cart 10 is illustrated including a pair of wheels 16, supporting a frame 18, but it should be understood that cart 10 can alternatively be configured to include an additional number of wheels, tracks, or other apparatus affording suitable mobility, as desired or required for a particular application.

As noted above, when collecting cobs while harvesting, often the cob container will require unloading at times different than those when unloading the corn is required. Additionally, sometimes it is desired to unload on the go into an accompanying container, such as a grain truck or wagon traveling alongside the cart (e.g., FIGS. 3 and 4), and at other times, onto a stationary location such as the ground at the edge of a field, or the like (e.g., FIG. 5). In the first instance, accuracy, and the ability to distribute the cobs within the receiving receptacle are typically more important than speed of the unloading process as this mode of unloading is often used while still harvesting, whereas in the latter instance speed is typically more important, as harvesting time is being lost during the unloading. As explained below, cart 10 is configured so as to be operable for unloading in one mode, in a continuous, controllable linear stream directed away from the cart, and alternatively, in a second mode comprising a flow of the material over a side of the cart.

Cart 10 includes a conveyor floor 20, preferably a belt conveyor, supported on frame 18. Cart 10 includes a first belt conveyor 22, and a second belt conveyor 24, supported on frame 18 so as to bound opposite edges 26 and 28 of floor conveyor 20 and extending upwardly therefrom at an inclined orientation. Here, the incline is about 60 degrees relative to horizontal, but other angles of inclination can also be used as desired. Floor conveyor 20, first and second belt conveyors 22 and 24, and front and rear end panels 30 and 32, bound and define an upwardly open interior cavity 34 of cart 10 (rear panel 32 being removed in FIGS. 2, 3 and 5) adapted for receiving a quantity of cobs, as illustrated by cobs 36. In this regard, conveyor floor 20 preferably encompasses substantially the entire bottom of cavity 34 and first and second belt conveyors have widths and heights so as to encompass substantially the entire sides of cavity 34 between conveyor floor 20 and end panels 30 and 32, and are located within an outer containing enclosure 38, which can be of suitable material such as sheet metal or plastics, and incorporate end panels 30 and 32 for containing the contents of cavity 34.

Conveyor floor 20, first belt conveyor 22 and second belt conveyor 24, include front to rear extending elongate rollers 40 suitably supported on frame 18 and enclosure 38 in the positions shown, and encircled by endless floor belt 42, and inclined belts 44 and 46, respectively. Belts 42, 44 and 46 are preferably of a sheet or fabric material, and include outwardly projecting slats 48 adapted for conveying cobs 36 therealong, as denoted by arrows A and B in FIGS. 3, 4 and 5. Additional rollers 50 are disposed intermediate rollers of each conveyor, for supporting belts 42, 44 and 46 between rollers 40. Selected ones of rollers 40 are rotatably driven by drives 52 operable for moving the belts as denoted by arrows A and B, which drives 52 can comprise, for instance, fluid or electrically powered motors, or belt or chain drives. Each of belt conveyors 22 and 24 is suitably constructed for conveying a flow of cobs upwardly therealong, and over an upper peripheral edge portion 54 or 56 thereof, respectively.

Cart 10 includes an unloading conveyor 58 suitably supported by pivot support structure 60 (FIGS. 4 and 6), beside container enclosure 38 and just below first belt conveyor 22, for movement between a stored position extending alongside the cart (FIGS. 1, 2 and 5), and an operating position (FIGS. 3 and 4) extending outwardly and upwardly therefrom in cantilever relation thereto. Unloading conveyor 58 is preferably a belt conveyor as depicted here, including an elongate frame 62 having a first end 64 supported for pivotal movement on structure 62, and a second or free end 66. Frame 62 supports a pair of rollers 40 at ends 64 and 66, encircled by an endless belt 68, driven by a drive 52, that can again be a fluid motor or the like operable moving belt 68 toward free end 66.

Pivot support structure 60 can comprise any suitable structure adapted for supporting conveyor 58 in the above described manner, such as a tubular frame as shown having a saddle like configuration extending about the upper portion of wheel 16 of the cart and including a pivot joint 70 (FIGS. 4 and 6) supporting conveyor 58. Powered pivotal movement of conveyor 58 can be achieved in any suitable manner, such as, but not limited to, using a driver 72 such as a fluid cylinder (FIG. 6), rotary actuator or the like, connected between cart 10 and conveyor 58, driver 72 being extendable for moving the conveyor to the operating position, and retractable for moving it to the stored position.

Cart 10 additionally includes a transfer conveyor 74 disposed between first belt conveyor 22 and unloading conveyor 58, for receiving the flow of cobs from conveyor 22, and conveying them to unloading conveyor 58. Transfer conveyor 74 preferably extends along and just outwardly of upper peripheral edge portion 54 of conveyor 22, in position for receiving the cobs conveyed thereby. Unloading conveyor 58 here is depicted as being located adjacent to a center region of belt conveyor 22, and conveyor 74 preferably comprises a helical auger having opposite front and rear helical flights 76 and 78, respectively, and driven by a suitable rotary drive 52, e.g., a fluid or electric motor, such that cobs from conveyor 22 entering conveyor 74 will be conveyed to the center region (denoted by arrows B), and to unloading conveyor 58. A funnel 80 is shown disposed above unloading conveyor 58 for guiding the cobs thereon as the flow transitions from conveyor 74 to that conveyor.

Figure 4:
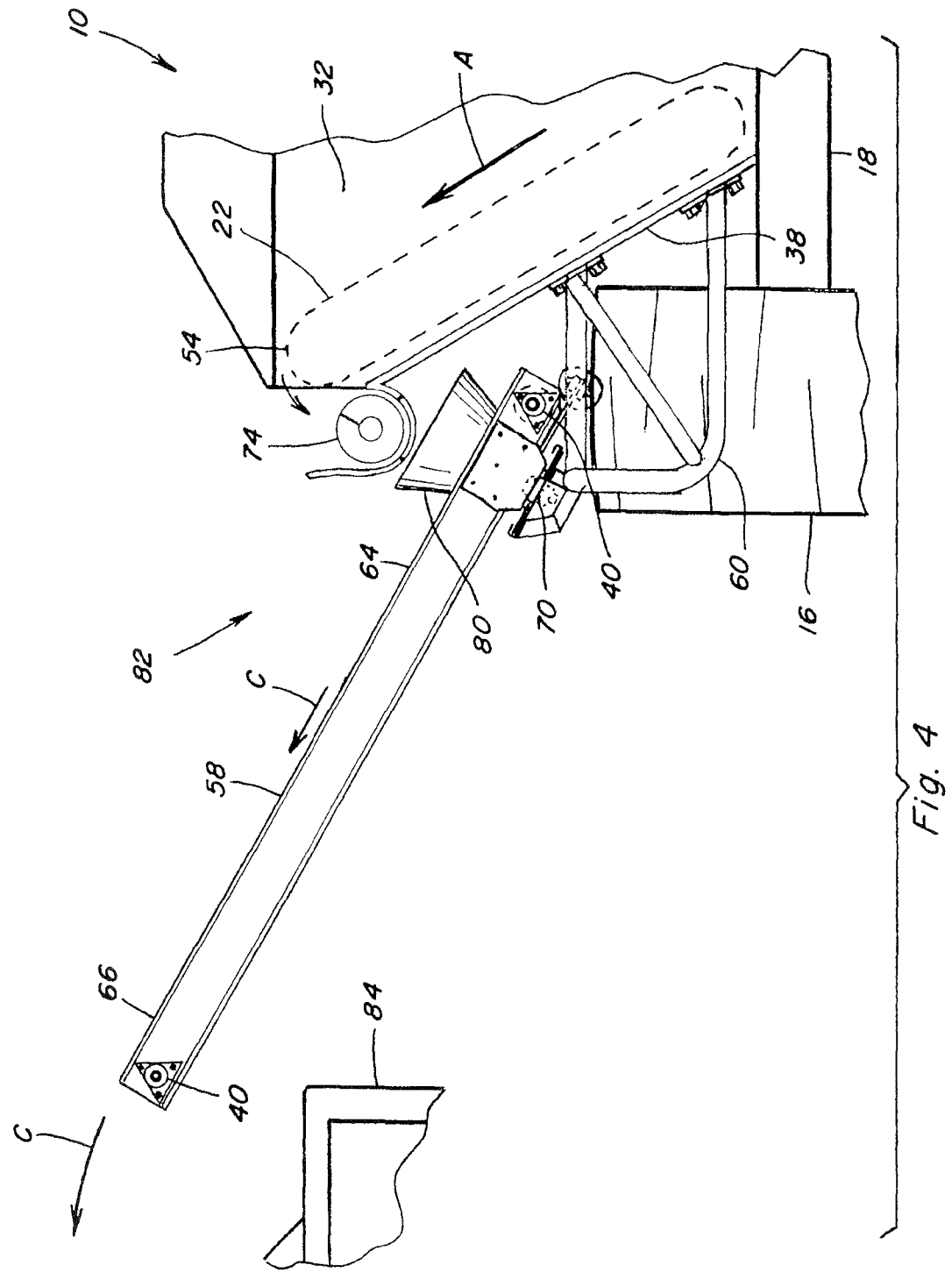
FIG. 4 is an enlarged fragmentary rear view of the cart and the wagon, showing the unloading conveyor in the operational position and denoting unloading bulk materials using arrows.
Figure 5:
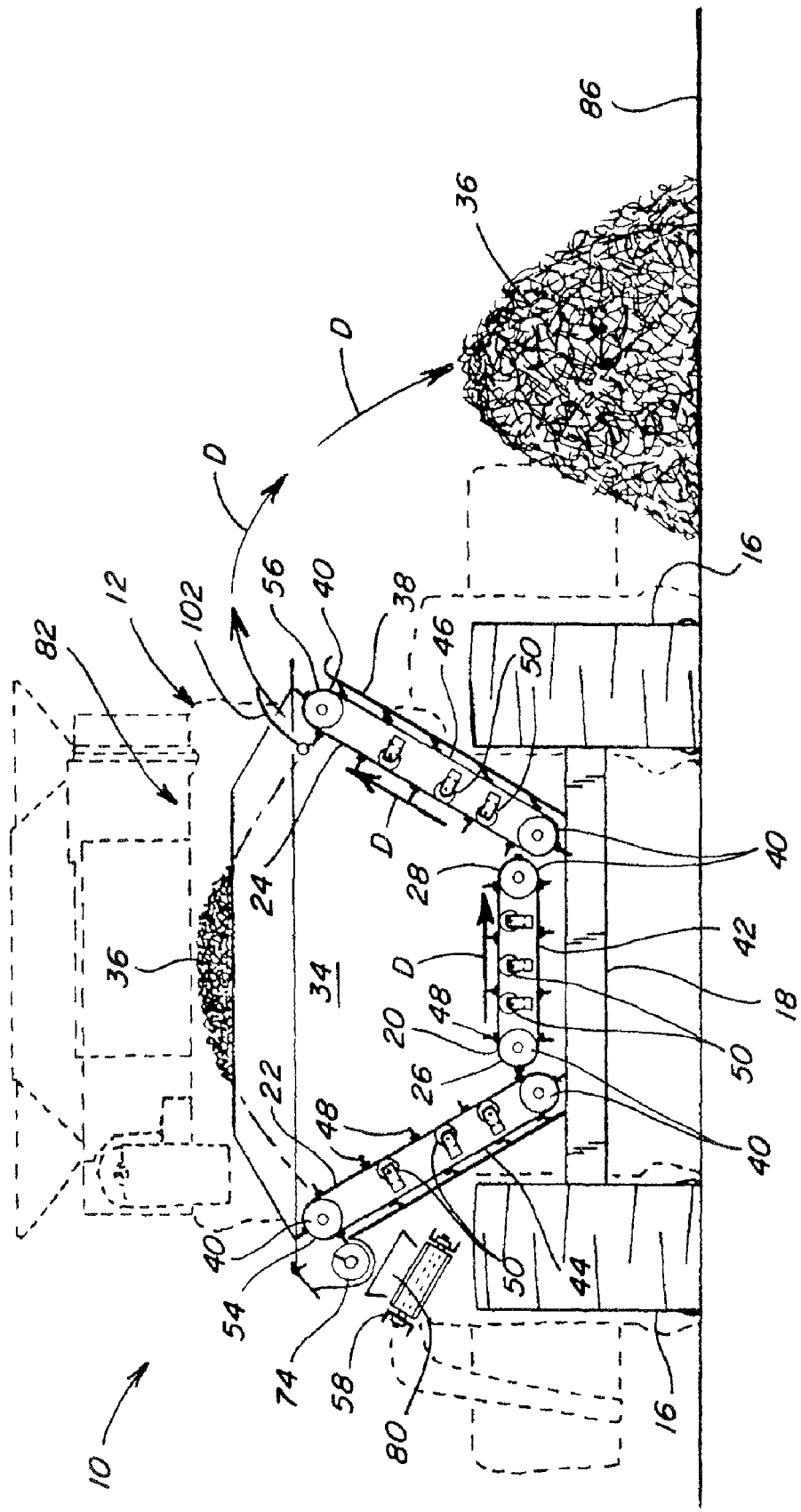
FIG. 5 is another rear end view of the cart with the rear panel removed, and the accompanying combine, showing unloading of bulk material from the cart onto the ground as denoted by arrows.
Figure 6:
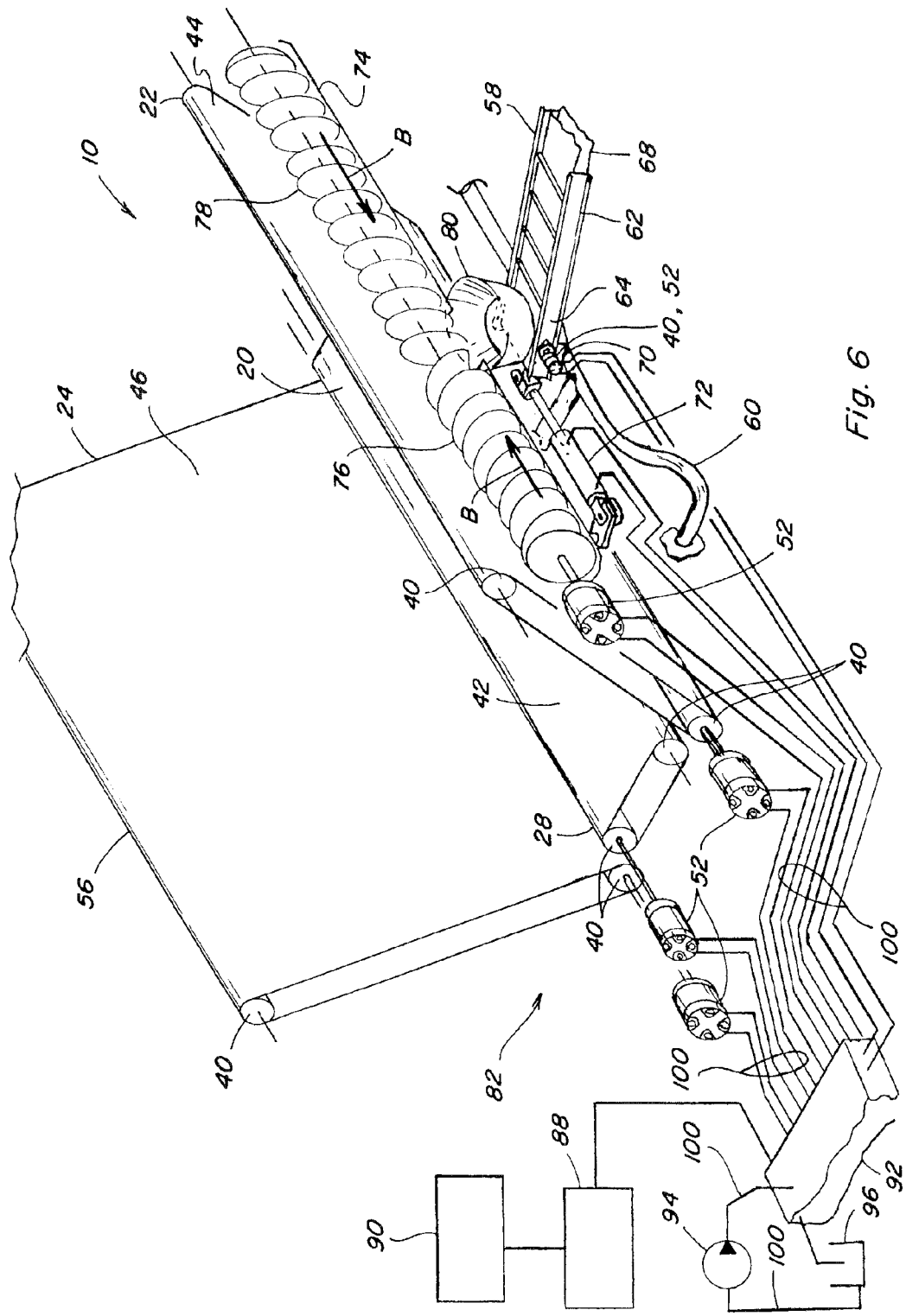
FIG. 6 is a simplified schematic diagram of the cart, showing aspects of a dual unloading system thereof.

Conveyor floor 20, belt conveyors 22 and 24, transfer conveyor 74, and unloading conveyor 58, preferably comprise elements of a dual unload system 82 of the invention, controllable for automatically selectably unloading cobs 36 into another container, such as a wagon 84, (FIGS. 3 and 4) or onto a surface such as the ground 86 (FIG. 5). Referring in particular to FIG. 6, to accomplish this, dual unload system 82 preferably includes, or is controlled by, a processor based controller 88 connected to an operator controllable input device 90 via a suitable conductive path, such as a wiring harness of cart 10, a wireless communications network, or the like. Controller 88, in turn, is connected in operative control of a valve block 92 connected in fluid communication with a pressurized fluid source 94, which can be a pump or the like, and a tank 96, via fluid lines 100. Valve block 92 is connected in fluid communication with each of drives 52 of conveyor floor 20; conveyors 22, 24, 58 and 74; and driver 72 via additional fluid lines 100, and is controllable for directing pressurized fluid from source 94 to those devices, and from those devices to tank 96. One or more of controller 88, input device 90, valve block 92, source 94 and tank 96, can be located on cart 10, or, can be located on a towing vehicle, such as combine 12. Further, input device 90 can be located remotely, such as in the cab of an accompanying vehicle for such as a tractor or truck for receiving the cobs from cart 10.

As additional features, cart 10 can include a deflector 102 disposed in spaced relation above upper peripheral edge portion 56 of conveyor 24 (and along edge portion 54 of conveyor 22) along the width thereof, which is operable for deflecting cobs conveyed thereby in a desired manner, e.g., downwardly from cart 10. Cart 10 can optionally also include apparatus for conveying cobs into interior cavity 34, such as, but not limited to, an inclined conveyor 104 (FIG. 1) on the front end of frame 18, in position for receiving a flow of cobs directly from a producing source such as combine 12 towing cart 10, or via one or more intermediate conveyors.

Figure 3:
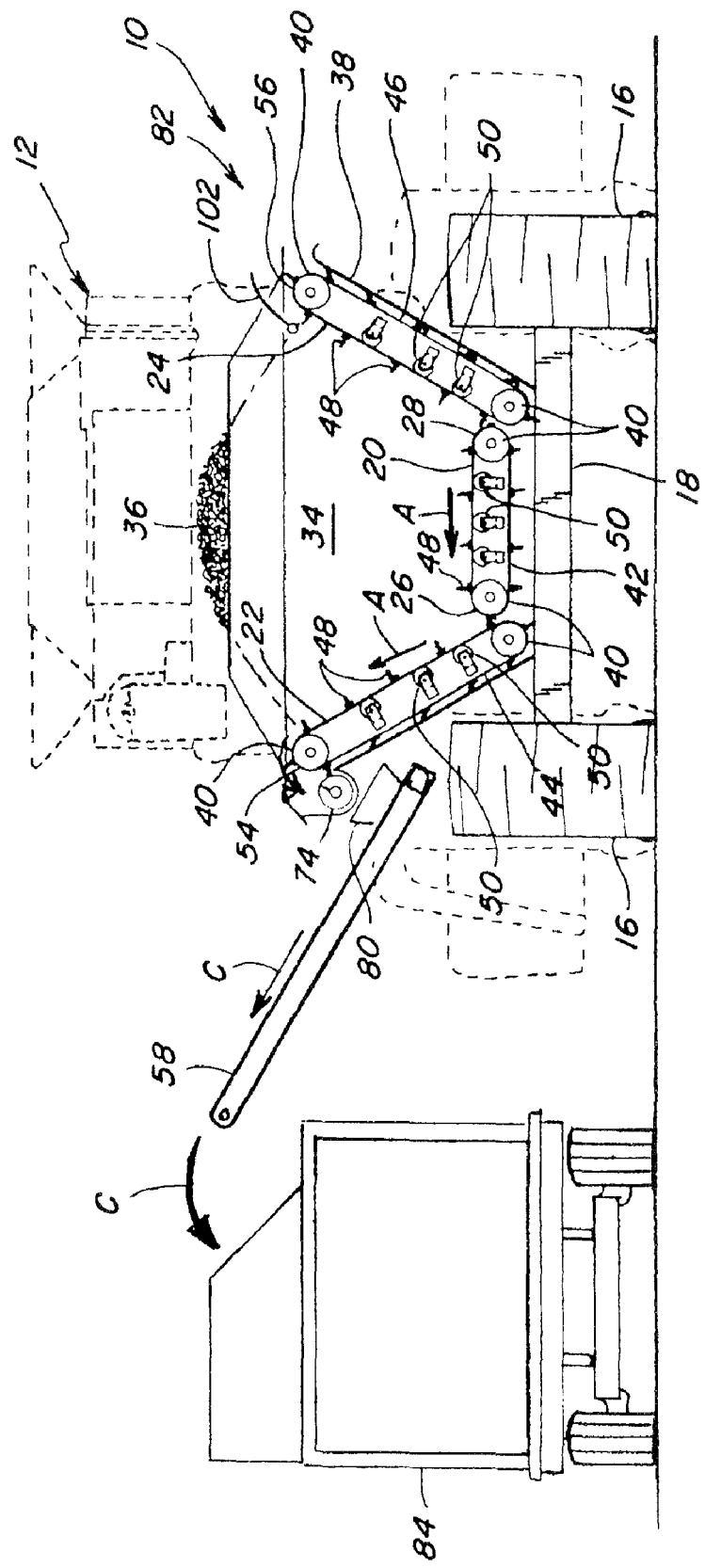
FIG. 3 is another rear end view of the cart with the rear panel removed, showing the combine and an accompanying wagon, and an unloading conveyor of the dual unloading system in a sidewardly extending operational position for unloading bulk materials from the cart into the wagon as denoted by arrows.

Referring more particularly to FIGS. 3 and 4, dual unload system 82 of cart 10 is selectably operable in a first mode wherein conveyor floor 20 and first belt conveyor 22 are simultaneously operated for conveying a flow of cobs 36 within cavity 34 in a first direction, denoted by arrow A, toward transfer conveyor 74. At the same time, transfer conveyor 74 is operated to convey the received flow of cobs toward the center region thereof, through funnel 80 onto unloading conveyor 58, as denoted by arrows B. The flow of cobs thus received from transfer conveyor 74 will then be conveyed upwardly and outwardly therealong, as denoted by arrows C, to an accompanying receiver, such as wagon 84, or other location. This unloading is advantageous, as it allows the cobs to be unloaded into an accompanying vehicle moving beside combine 12, accurately, and on the go, as combine 12 continues to harvest.

Referring more particularly to FIG. 5, dual unload system 82 of cart 10 is alternatively selectably operable in a second mode wherein conveyor floor 20 and second belt conveyor 24 are simultaneously operated for conveying a flow of cobs 36 within cavity 34 in a second direction, denoted by arrows D, upwardly and outwardly of cavity 34 over upper edge portion 56, onto the ground 86 or another surface or location, as guided or controlled by deflector 102. This is advantageous for piling cobs 36 at locations such as along the edge of a field or the like, for later pick up.

Here, it should be recognized that cart 10 can be configured for having unloading conveyor 58 and transfer conveyor 74 on either side, as desired or required for a particular application, and that transfer conveyor 74 can alternatively comprise a belt or other type conveyor, and that, likewise, unloading conveyor 58 could comprise a helical auger type conveyor or the like. Still further, while cart 10 is shown here including wheels 16, it could alternatively comprise tracks or the like.

Figure 7:
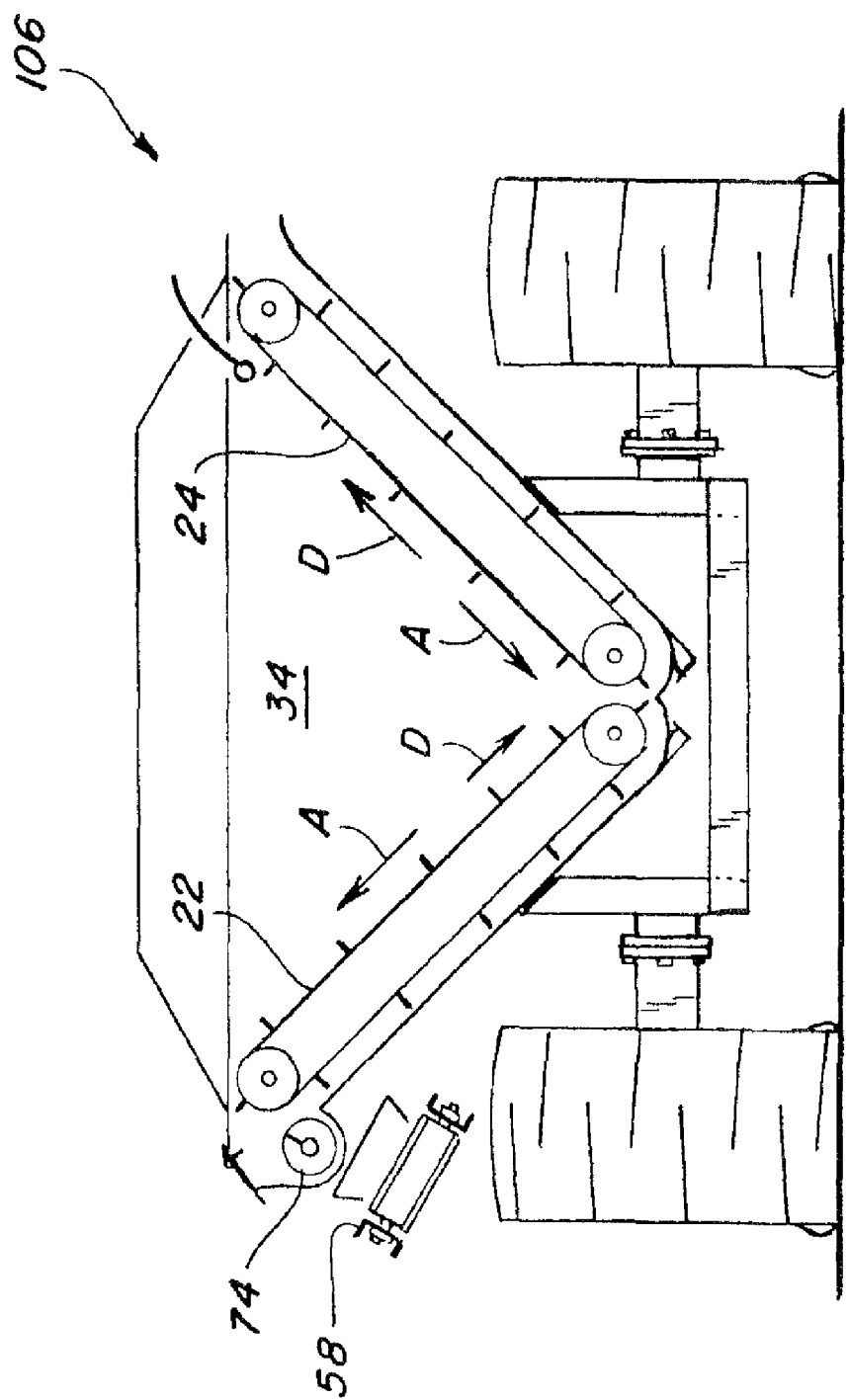
FIG. 7 is an enlarged rear view of an alternative embodiment of the cart including only inclined belt conveyors.

Referring also to FIG. 7, an alternative cart 106, constructed and operable according to the teachings of the present invention, is shown, like parts of cart 106 and cart 10 being identified by like numerals. Cart 106 differs from cart 10 essentially in the elimination of the conveyor floor, such that interior cavity 34 of the card is defined by only inclined belt conveyors 22 and 24. Cart 106 still includes unloading conveyor 58 and transfer conveyor 74, and is operable in the above described manner, except for the operation of the floor conveyor. Instead, both conveyors 22 and 24 would preferably be operated in the same direction for unloading in the mode for that direction. That is, at least conveyor 22 and optionally conveyor 24 would be operated in direction A for conveying materials to transfer conveyor 74 which would be operated to convey to unloading conveyor 58 (when in the operating position); and at least conveyor 24 and optionally conveyor 22 would be operated in direction D for unloading over that side of the cart.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A bulk materials cart having a dual unload capability, comprising:

a mobile structure including a floor and plurality of upstanding walls extending upwardly around the floor defining a cavity, the walls including upper peripheral edge portions, respectively, extending about an upper region of the cavity, at least a portion of the floor comprising a conveyor selectably operably movable for conveying bulk materials thereon toward a first one of the upstanding walls and a second one of the upstanding walls, respectively;

the first one of the upstanding walls comprising a first belt conveyor inclined upwardly from the floor and configured to be controllably operable for conveying bulk materials upwardly and over the upper peripheral edge portion thereof;

the second one of the upstanding walls comprising a second belt conveyor inclined upwardly from the floor and configured to be controllably operable for conveying bulk materials upwardly and over the upper peripheral edge portion thereof;

an unloading conveyor disposed adjacent to the upper peripheral edge portion of the second one of the upstanding walls, configurable in an operating position extending outwardly from the cart in cantilever relation thereto in position for receiving the materials conveyed by the belt conveyor of the second one of the walls and conveying the materials outwardly therefrom; and a transfer conveyor disposed adjacent to the upper peripheral edge portion of said second one of the walls, the transfer conveyor being configured and operable for transferring bulk materials from the belt conveyor of said second one of the walls to the unloading conveyor, wherein the second belt conveyor has a width about coextensive with a width of said second one of the upstanding walls, the transfer conveyor has a length about coextensive with the width of the second conveyor for receiving the bulk materials therefrom along the length of the transfer conveyor, and the transfer conveyor is configured and operable for conveying the bulk materials from opposite ends thereof to a center portion thereof, and the unloading conveyor is disposed adjacent to the center portion of the transfer conveyor in position for receiving the bulk materials therefrom.

2. The bulk materials cart of claim 1, wherein the unloading conveyor is mounted for pivotal movement between the operational position and a stored position beside said second one of the walls.

3. A bulk materials cart, comprising:

a dual unload system comprising a mobile structure defining and enclosing a cavity for holding a quantity of bulk materials, the structure including at least two belt conveyors bounding the cavity at an inclined orientation, one of the belt conveyors extending and operable for conveying bulk materials from the cavity to an unloading conveyor mounted to the structure for movement to a position extending outwardly therefrom, and another of the belt conveyors being operable for conveying bulk materials upwardly and thereover from the cavity; and wherein the dual unload system is automatically operable in a first unload mode operating said one of the belt conveyors for conveying the bulk materials to the unloading conveyor, while operating the unloading conveyor for conveying the bulk materials away from the cart, and the unload system being automatically operable in a second unload mode operating said another of the belt conveyors for conveying the bulk materials outwardly from the cavity over said another of the belt conveyors, wherein the dual unload system comprises a transfer conveyor disposed between said one of the belt conveyors and the unloading conveyor, wherein said one of the belt conveyors has a width, the transfer conveyor has a length about coextensive with said width for receiving the bulk materials therefrom along the length of the transfer conveyor, and the transfer conveyor is configured and operable for conveying the bulk materials from opposite ends thereof to a center portion thereof, and the unloading conveyor is disposed adjacent to the center portion of the transfer conveyor in position for receiving the bulk materials therefrom.

4. The bulk materials cart of claim 3, further comprising a deflector disposed in spaced relation above an upper outer peripheral edge portion of said another of the belt conveyors, configured for deflecting materials conveyed thereover outwardly therefrom.

5. The bulk materials cart of claim 3, wherein the unloading conveyor is mounted for pivotal movement between an operational position and a stored position beside said one of the belt conveyors.

6. The bulk materials cart of claim 3, wherein the belt conveyors comprise slats extending across a width thereof adapted for conveying corn cobs.

7. The bulk materials cart of claim 3, further comprising a conveyor floor disposed between bottom portions of the belt conveyors and selectably operable for conveying bulk materials in the cavity toward the belt conveyors, respectively.

* * * * *